Oct. 23, 1962  M. D. JENNINGS ETAL  3,059,437
CUTTER FOR SEED TAPE PLANTER
Filed July 15, 1959  2 Sheets-Sheet 1
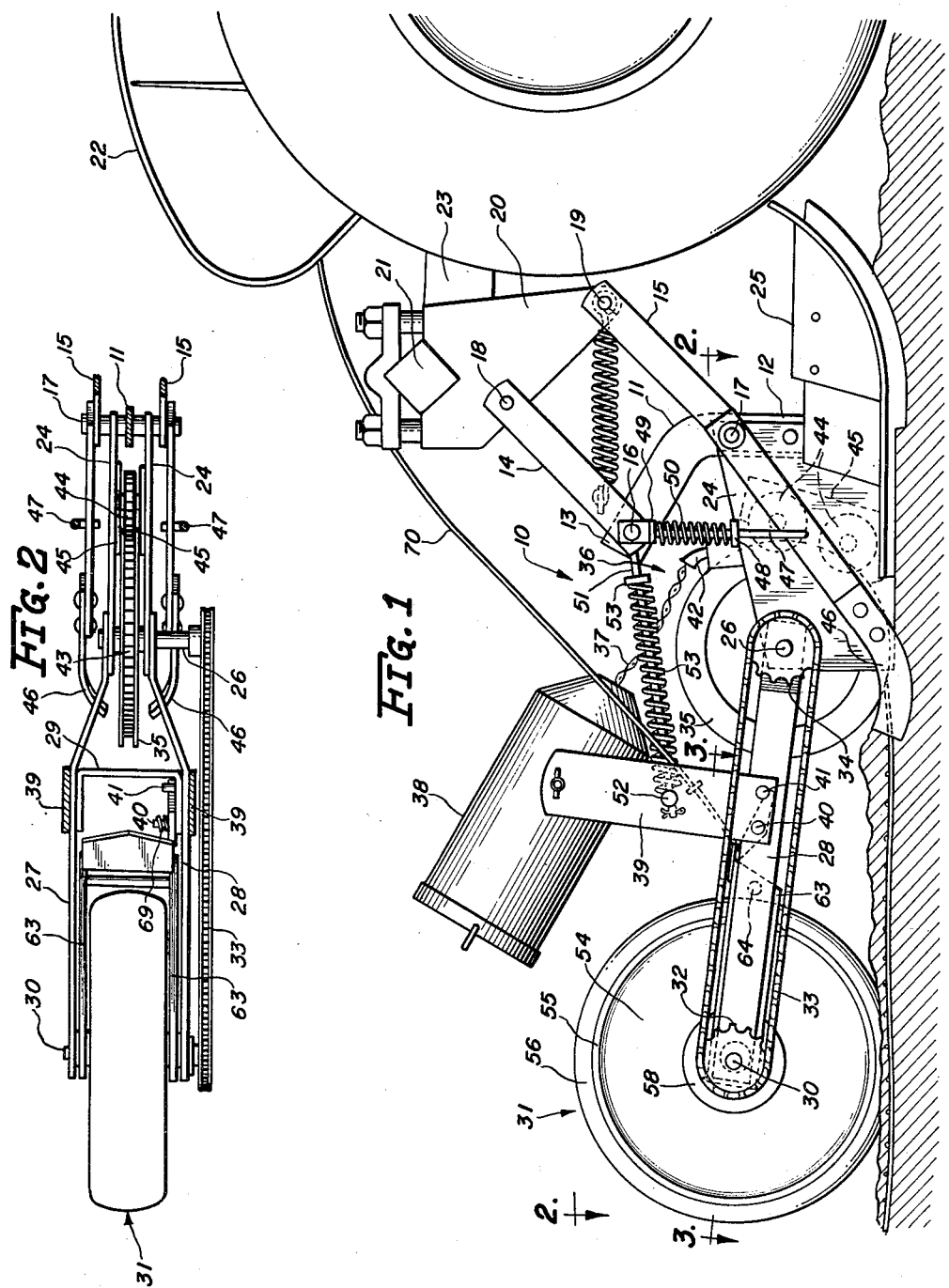
INVENTORS
Marvin D. Jennings
Ralph P. Amato
ATTORNEY Oct. 23, 1962    M. D. JENNINGS ETAL    3,059,437
CUTTER FOR SEED TAPE PLANTER
Filed July 15, 1959    2 Sheets-Sheet 2
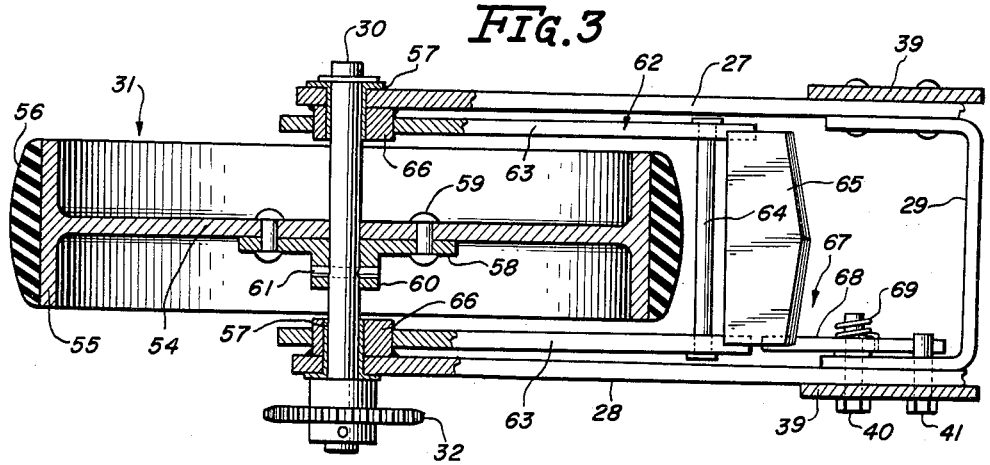
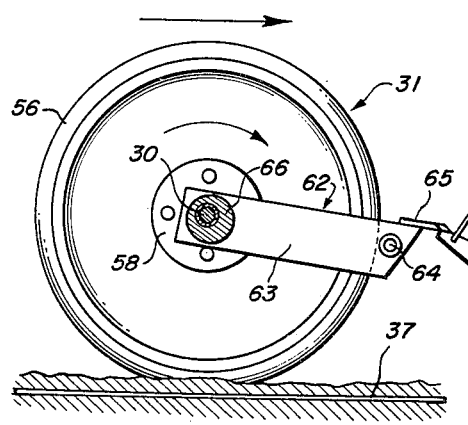
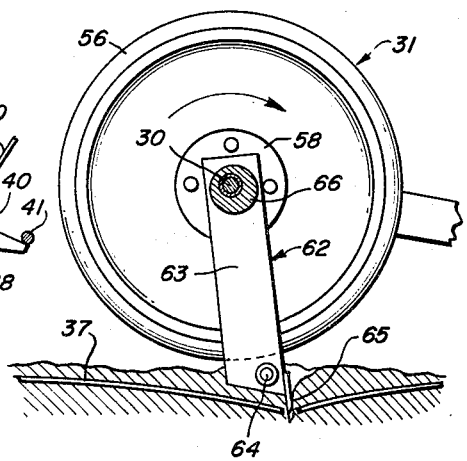
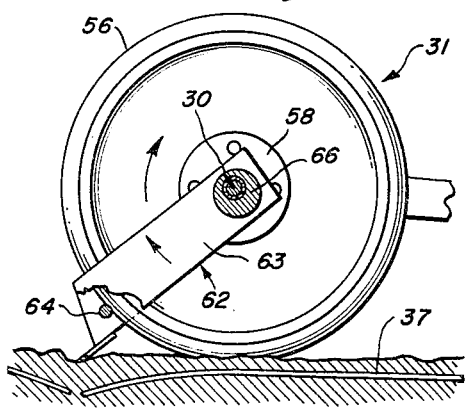
INVENTORS
Marvin D. Jennings
Ralph P. Amato
Paul O. Pippel
ATTORNEY

United States Patent Office 3,059,437
Patented Oct. 23, 1962

3,059,437
CUTTER FOR SEED TAPE PLANTER
Marvin D. Jennings, Naperville, and Ralph P. Amato, Chicago, Ill., assignors to International Harvester Company, Chicago, Ill., a corporation of New Jersey
Filed July 15, 1959, Ser. No. 827,294
7 Claims. (Cl. 61—72.6)

This invention relates to agricultural implements and particularly to planters. More specifically, the invention concerns planters for seed tape and the like.

The present invention has for its object the provision of simple, economical and efficient means for cutting the tape during the progress of the machine over a field, as when turning at the end of a field.

Another object of the invention is the provision, in a planter for seed tape and the like, of a tape cutting device which operates in conjunction with the planter press wheel to sever the tape after it has been deposited in the furrow.

With these and other objects in view, the present invention contemplates the provision, in a seed tape planter including a furrow opener, a feed wheel for the tape, and a press wheel for pressing the tape in the ground, of a tape cutting blade or knife carried at the end of a supporting arm in the form of a yoke pivoted on the press wheel shaft on an axis eccentric to the axis of the shaft, said yoke being normally latched to the frame but releasable to allow the yoke with the cutter at its end to swing downwardly into engagement with the ground and the tape, and then in an orbit around the wheel and back to its latched position.

Other objects and advantages of the invention will become clear from the following detailed description when read in conjunction with the accompanying drawings wherein:

FIGURE 1 is a view in side elevation of the rear end of a tractor with a tape planter unit incorporating the features of this invention mounted thereon;

FIGURE 2 is a section taken on the line 2—2 of FIGURE 1;

FIGURE 3 is a section taken on the line 3—3 of FIGURE 1, and on an enlarged scale;

FIGURE 4 is a detail of the planter press wheel and the associated tape cutting device in the non-operating position therof;

FIGURE 5 is a view similar to FIGURE 4 showing the tape being cut; and

FIGURE 6 shows the position of the cutting device after the tape has been severed and before the cutter has returned to its inoperative position.

In the drawings the numeral 10 designates generally the supporting frame of a tape planter unit incorporating the features of this invention, comprising a standard 11 having a vertical section 12 and a rearwardly bent upper section 13. Laterally spaced pairs of vertically spaced generally parallel links 14 and 15 are pivotally connected to standard 11 by transversely extending pivot pins 16 and 17, respectively. The forward ends of links 14 and 15 are pivotally connected at 18 and 19 to a bracket 20 secured to a transverse tool bar 21 connected to a tractor 22, in draft receiving relation, by a drawbar 23.

Also forming part of the supporting frame of the planter unit are a pair of laterally spaced plates 24 mounted at their forward ends on the pivot pin 17 and secured to standard 11. An earth penetrating tool in the form of a furrow opener 25 is mounted on the lower ends of plates 24.

The rear upper ends of plates 24 carry a transverse shaft 26 upon which are pivotally mounted the forward ends of a pair of forwardly converging wheel-carrying beams 27 and 28 connected by a brace 29 and carrying at their rear ends a transverse shaft 30 upon which is rotatably mounted a press wheel 31.

One end of shaft 30 has secured thereto a sprocket wheel 32 drivingly connected by a chain 33 with a sprocket wheel 34 mounted on one end of shaft 26.

Propelling of the planter unit over the ground by a tractor 22 and rotation of press wheel 31, acts through chain 33 to drive shaft 26, upon which is mounted, between plates 24 and beams 27 and 28, a wheel 35 forming part of a tape feeding unit 36.

The feeding assembly 36 is adapted to receive the tape 37 from a supply source in the form of a cylindrical container 38 mounted between a pair of uprights 39 secured to beams 27 and 28 by bolts 40 and 41.

Although it may be noted that the details of construction of the feeding assembly 36 form no part of this invention, tape 37 withdrawn from the container 38 is passed through a guide tube 42 secured to plates 24 and engages the corrugated periphery 43 of feed wheel 35. On the periphery of wheel 35, the tape is engaged by a pair of similarly corrugated idler rollers 44 carried by a pair of spaced plates 45 secured to plates 24 and having arcuately shaped forward edges conforming generally to the curvature of wheel 35. The corrugated rollers 44 fit the corrugations of the periphery 43 of wheel 35, deform or crimp the seed-containing tape received therebetween and direct it into the furrow formed by the furrow opening tool 25.

A pair of cover blades 46 engage the sides of the furrow rearwardly of wheel 35 and cover with dirt the tape deposited in the furrow, the upper ends of the blade members being pivotally mounted on the ends of pivot pin 17. The blades 46 are urged downwardly by the provision of a rod 47 connected at its upper end to pivot pin 16 and at its lower end to the associated blade 46, said rod having secured thereto a collar 48 and a shoulder 49 engaged by a coil spring 50 surrounding the rod.

By virtue of the pivotal connection of the forward ends of beams 27 and 28 to frame plates 24, wheel 31 is capable of vertical swinging relative thereto, and this action is resiliently resisted by the provision of a pair of rods 51, only one of which is shown, anchored at one end to pivot pin 16 and having its other end slidably receivable in a suitable opening provided in a rod 52 extending between the uprights 39 and surrounded by a spring 53 engaging rod 52 at one end and a collar 53 on rod 51.

Seed tape deposited in the furrow formed by the tool 25, is covered with dirt by blades 46 and the dirt in the furrow compressed by wheel 31, which comprises a web portion 54, a rim 55 and a rubber tire 56. Wheel 31 is secured to shaft 30, which is rotatably mounted in bearings 57 carried at the ends of arms or beams 27 and 28, by means of a plate 58 secured to the web 54 by rivets or bolts 59 and having an extension 60 fastened to the shaft 30 by a pin 61 extending through registering openings in extension 60 and shaft 30.

When the planter is to be turned at the end of a field it is desirable that the continuous tape be severed, and this is accomplished by novel tape cutting means under the control of the tractor operator. This tape cutting means includes a yoke 62 comprising a pair of laterally spaced rearwardly extending arms 63 straddling wheel 31 and connected at their forward ends by a transverse bar or rod 64 and having secured to their upper edges a transversely extending knife blade 65 having a sharpened forward edge.

The rear ends of arms 63 are each rotatably mounted on an eccentric member 66 affixed, as by welding, to the inner surfaces of the rear ends of beams 27 and 28, said members being eccentrically mounted with respect to the axis of shaft 30. Thus, as shown in FIGURES 4, 5 and 6, yoke 62 swings downwardly, rearwardly and upwardly in an orbit about the axis of shaft 30. Blade 65, which projects forwardly beyond the ends of arms 63, engages the ground, severing the tape in the furrow, and causes wheel 31 to rise from the ground and vault forward.

The yoke 62 is held in the inoperative position shown in FIGURES 1 to 4 by latch mechanism generally indicated at 67 and comprising a rockable member 68 pivotally mounted on the inwardly projecting end of bolt 40 and anchored at one end to a torsion spring 69, the other end of which is anchored to the bolt 40, tending to rock the member 68 in an anti-clockwise direction, as viewed in FIGURE 4, such rocking being opposed by a stop in the form of the inwardly projecting end of bolt 41. The end of the rockable member 68 opposite stop 41 engages the under side of the forwardly projecting portion of the knife blade 65 and holds the yoke 62 in an inoperative position. The latch member 68 is released by the provision of a cable 70 leading from a location adjacent the tractor operator to the end of latch member 68 engaging blade 65. By pulling on cable 70, the tractor operator rocks latch member 68 in a clockwise direction past the forward edge of blade 65 to allow the yoke to fall and go through the part of a 360 degree cycle illustrated in FIGURES 4 to 6.

As will be observed clearly in FIGURE 4, rod 64 connecting the forward ends of arms 63, is spaced from the periphery of wheel 31, and remains so until it reaches a position such as indicated in FIGURE 6, where the rod 64 has moved closer to the axis of shaft 30 and has come into engagement with the rim or tire 56. This frictional engagement of rod 64 with the periphery of wheel 31 causes the latter, in its forward motion, to carry the yoke 62 upwardly with it and forwardly until the blade 65 again engages the latch member 68. It may be noted in this connection that since the tire 56 is rubber and inherently flexible, the pressure of rod 64 against its periphery is insufficient at any point in the rotation of the wheel to cause the wheel to be locked.

It is believed that the seed tape planter and the tape cutting apparatus therefor of this invention will be clearly understood from the foregoing description. It shall likewise be understood that the invention has been described in its preferred embodiment only, and that modifications may be made therein without departing from the spirit of the invention or the scope of the appended claims.

What is claimed is:

1. In a planter for seed tape and the like including a traveling support, a furrow opener mounted on the support, a source of continuous seed tape carried by the support and feed means mounted on the support for receiving the tape from the source and directing it to the furrow, the combination of a ground engaging wheel mounted on the support rearwardly of the feeding means and arranged to press into the furrow the tape deposited therein by said feed means, means in the mounting of said ground engaging wheel on the support and actuated during the forward travel of the planter for severing the tape, comprising a blade carrier pivotally mounted on the support alongside said wheel on an axis eccentric to the axis of the wheel and extending beyond the periphery thereof, and latching means mounted on the support holding the carrier to the support and releasable to cause the blade carrier to swing downwardly into engagement with the ground, severing the tape, said blade carrier being adapted to engage the ground and pass rearwardly under the wheel to thereby lift the wheel and cause the latter to vault forwardly by the forward movement of the support.

2. The invention set forth in claim 1, wherein the pivot axis of said blade carrier on the support is eccentric to the wheel axis.

3. In a planter for seed tape and the like including a traveling support, a source of continuous tape carried by the support and feed means mounted on the support for laying the tape on the ground, the combination of means for severing the tape comprising an axle carried on the support rearwardly of said feed means, a ground engaging wheel mounted on the axle, a yoke including a transverse cutting blade disposed forwardly of the periphery of the wheel and arms pivotally mounted on said axle on an axis eccentric to the axis of the wheel, releasable means mounted on the support holding said yoke and blade in an inoperative position, said yoke being swingable downwardly, upon release of said holding means, into engagement with the tape and the ground, and said blade-carrying yoke being adapted to engage the ground and pass rearwardly under the wheel to thereby lift the wheel from the ground in response to the forward travel of the support until the wheel vaults forwardly about the point of engagement of said yoke with the ground.

4. In a planter for seed tape and the like including a traveling support, a source of continuous tape carried by the support and feed means mounted on the support for laying the tape on the ground, the combination of means for severing the tape comprising an axle carried on the support rearwardly of said feed means, a ground engaging wheel mounted on the axle, a yoke including a transverse cutting blade disposed forwardly of the periphery of the wheel and arms pivotally mounted on said axle on an axis eccentric to the axis of the wheel, releasable means mounted on the support holding said yoke and blade in an inoperative position, said yoke being swingable downwardly, upon release of said holding means into engagement with the tape and the ground, and said blade-carrying yoke being adapted to engage the ground and pass rearwardly under the wheel to thereby lift the wheel from the ground in response to the forward travel of the support until the wheel vaults forwardly about the point of engagement of said yoke with the ground, and means mounted on the yoke and engageable with the wheel during the forward travel of the support to swing the yoke over the top of the wheel, forwardly to its non-operating position.

5. In a planter for seed tape and the like including a traveling support, a source of continuous tape carried by the support and feed means mounted on the support for laying the tape on the ground, the combination of means for severing the tape, comprising a ground engaging wheel mounted on the support, a yoke having a transverse portion ahead of the wheel and rearwardly extending arms straddling the wheel, means pivotally mounting said arms on the support on an axis eccentric to the axis of the wheel, latch means on the support cooperative with said yoke to hold it in a non-operating position, and a cutting blade on said transverse portion adapted to swing downwardly into engagement with the ground and the tape, upon release of said latch means, and cause said wheel to vault forwardly about the point of engagement of said blade with the ground in response to the forward travel of the support.

6. In a planter for seed tape and the like including a traveling support, a source of continuous tape carried by the support and feed means mounted on the support for laying the tape on the ground, the combination of means for severing the tape, comprising a ground engaging wheel mounted on the support, a yoke having a transverse portion ahead of the wheel and rearwardly extending arms straddling the wheel, means pivotally mounting said arms on the support on an axis eccentric to the axis of the wheel, latch means on the support cooperative with said yoke to hold it in a non-operating position, and a cutting blade on said transverse portion adapted to swing downwardly into engagement with the ground and the tape upon release of said latch means, and cause said wheel to vault forwardly about the point of engagement of said blade with the ground in response to the forward travel of the support to a position with said transverse portion of the yoke rearwardly of the wheel, the position of said eccentric axis being such that as the wheel vaults forwardly, said transverse portion moves into frictional contact with the periphery of the wheel and is rotated forwardly with the wheel to a position in operative engagement with said latch means.

7. In a planter for seed tape and the like including a traveling support, a source of continuous tape carried by the support and feed means mounted on the support for laying the tape on the ground, the combination of means for severing the tape, comprising a ground engaging wheel mounted on the support, a yoke having a transverse portion ahead of the wheel and rearwardly extending arms straddling the wheel, means pivotally mounting the yoke on the support for swinging in an orbit about the axis of said wheel from a position with said transverse portion spaced from the periphery of the wheel to a position with said transverse portion in frictional engagement therewith, and a cutting blade carried by the yoke engageable with the ground in the path of swinging movement thereof to sever the tape.

References Cited in the file of this patent

UNITED STATES PATENTS

| 1,292,082 | Sanford | Jan. 21, 1919 |
| 2,843,068 | Smith et al. | July 15, 1958 |
| 2,869,284 | Abernathy | Jan. 20, 1959 |